(12) United States Patent
Schwartz et al.

(10) Patent No.: US 7,589,841 B2
(45) Date of Patent: Sep. 15, 2009

(54) SOLID-STATE LASER GYRO WITH A MECHANICALLY ACTIVATED GAIN MEDIUM

(75) Inventors: Sylvain Schwartz, Paris (FR); François Gutty, Chatellerault (FR); Jean-Paul Pocholle, La Norville (FR); Gilles Feugnet, Palaiseau (FR)

(73) Assignee: Thales, Neuilly-sur-Seine (FR)

( * ) Notice: Subject to any disclaimer, the term of this patent is extended or adjusted under 35 U.S.C. 154(b) by 257 days.

(21) Appl. No.: 11/840,868

(22) Filed: Aug. 17, 2007

(65) Prior Publication Data
US 2008/0043225 A1 Feb. 21, 2008

(30) Foreign Application Priority Data
Aug. 18, 2006 (FR) .................................. 06 07394

(51) Int. Cl.
*G01C 19/64* (2006.01)
(52) U.S. Cl. ..................................................... 356/459
(58) Field of Classification Search ................. 356/459, 356/460
See application file for complete search history.

(56) References Cited

U.S. PATENT DOCUMENTS

| | | | | |
|---|---|---|---|---|
| 4,525,843 A | * | 6/1985 | Diels | 372/94 |
| 4,913,548 A | * | 4/1990 | Vick | 356/461 |
| 5,367,528 A | | 11/1994 | Diels et al. | |
| 7,230,686 B1 | * | 6/2007 | Schwartz et al. | 356/28.5 |
| 7,319,513 B2 | * | 1/2008 | Schwartz et al. | 356/28.5 |
| 7,446,879 B2 | * | 11/2008 | Feugnet et al. | 356/459 |
| 7,474,406 B2 | * | 1/2009 | Feugnet et al. | 356/459 |
| 7,548,572 B2 | * | 6/2009 | Schwartz et al. | 372/94 |
| 2004/0202222 A1 | * | 10/2004 | Pocholle et al. | 372/75 |
| 2006/0256828 A1 | * | 11/2006 | Schwartz et al. | 372/94 |
| 2006/0285118 A1 | * | 12/2006 | Feugnet et al. | 356/471 |
| 2007/0223001 A1 | * | 9/2007 | Feugnet et al. | 356/460 |
| 2008/0037026 A1 | * | 2/2008 | Feugnet et al. | 356/459 |
| 2009/0073452 A1 | * | 3/2009 | Feugnet et al. | 356/459 |
| 2009/0116031 A1 | * | 5/2009 | Schwartz et al. | 356/459 |

FOREIGN PATENT DOCUMENTS

| | | |
|---|---|---|
| FR | 2478810 | 9/1981 |
| FR | 2853061 | 10/2004 |
| GB | 2010576 | 6/1979 |

OTHER PUBLICATIONS

U.S. Appl. No. 11/718,717, filed Oct. 16, 2005.

* cited by examiner

*Primary Examiner*—Patrick J Connolly
(74) *Attorney, Agent, or Firm*—Lowe Hauptman Ham & Berner, LLP

(57) ABSTRACT

The field of the invention is that of solid-state ring lasers or laser gyros. The laser gyro according to the invention comprises at least one optical cavity in the form of a ring and a solid-state amplifying medium which are designed so that two counterpropagating optical modes can propagate in opposite directions one with respect to the other inside said optical cavity and pass through the amplifying medium, said amplifying medium being coupled to an electromechanical device imparting on said amplifying medium a periodic translational movement along an axis substantially parallel to the direction of propagation of said optical modes. Thus, the population inversion grating, written by the standing wave into the amplifying medium, which disturbs the nominal operation of the laser gyro, is greatly attenuated.

16 Claims, 3 Drawing Sheets

SOLID-STATE LASER GYRO WITH A MECHANICALLY ACTIVATED GAIN MEDIUM

RELATED APPLICATIONS

The present application is based on, and claims priority from, France Application Number 06 07394, filed Aug. 18, 2006, the disclosure of which is hereby incorporated by reference herein in its entirety.

BACKGROUND OF THE INVENTION

1. Field of the Invention

The field of the invention is that of solid-state ring lasers, also called laser gyros. Almost all laser gyros use a gaseous amplifying medium, which is usually a mixture of helium and neon. However, it is possible to use a laser gyro having a solid-state amplifying medium in which the gaseous amplifying medium is replaced with a solid-state element, for example a neodymium-doped YAG (yttrium aluminium garnet) matrix.

2. Description of the Prior Art

The operating principle of a laser gyro is based on the Sagnac effect of a bidirectional ring laser cavity undergoing a rotational movement. The Sagnac effect induces a frequency difference Q between two counterpropagating optical emission modes that propagate in opposite directions inside the cavity. In the solid-state media normally used, including Nd:YAG, the modes propagating in opposite directions share the same amplifying atoms. The gain is therefore said to be homogeneous. When the two counterpropagating modes have the same or very similar frequencies, the interference signal that results therefrom is a standing wave, which may possibly be moving. The atoms of the gain medium participate more in the stimulated emission process when they are close to an antinode of the standing wave and less when they are close to a node. This therefore creates, in the gain medium, a population inversion grating written by the standing wave. This grating continues to exist as long as the frequencies of the two counterpropagating modes are sufficiently close. Its contrast is lower the greater the frequency difference compared with the inverse of the lifetime of the excited level. It has been shown that this population inversion grating has deleterious effects for gyro measurements, for two main reasons:

it exacerbates the competition between the counterpropagating modes, preventing in most cases the beat regime, which is the operating regime to be established in a gyrometer; and it induces a non-linearity in the frequency response when the laser is rotating, thereby degrading the inertial performance.

The first of these points may be dealt with by various techniques based for example on electronic feedback devices. An optical device placed in the cavity acts differently on the intensity of the modes according to their direction of propagation. These devices are generally based on non-reciprocal optical effects, such as the Faraday effect.

However, the devices used to deal with the problem of intermodal competition perform less well at low rotation speeds and do not in general get round the problem of non-linearity of the frequency response of the laser gyro. This problem may for example be solved by introducing a strong frequency bias between the two counterpropagating modes. It is then necessary to control the stability of the bias used, otherwise the inertial performance is limited. It is also possible to eliminate the standing wave in the gain medium and the population inversion grating generated by this wave by ensuring that the polarization states are orthogonal when they interact with the crystal. The latter technique requires the birefringence in the cavity to be controlled, which means it is difficult to use when high inertial performance is required.

SUMMARY OF THE INVENTION

The principle of the device according to the invention is to modulate the longitudinal position of the active crystal about a mean position, so that the atoms of the crystal are moving relative to the nodes and to the antinodes of the interference pattern formed by the two counterpropagating modes, irrespective of the frequency difference between these two modes. The device according to the invention makes it possible to reduce the contrast of the gain grating, and therefore its deleterious effects on gyro measurements, while not modifying the length of the cavity. The device also makes it possible to attenuate the effects of the backscattering induced by the amplifying medium. Finally, the device according to the invention potentially constitutes a device for dealing with the blind spot, being able, depending on the face, to substitute for or be complementary to the usual mechanical activation device.

More precisely, the subject of the invention is a laser gyro comprising at least one optical cavity in the form of a ring and a solid-state amplifying medium which are designed so that two counterpropagating optical modes can propagate in opposite directions one with respect to the other inside said optical cavity and pass through the amplifying medium, characterized in that said amplifying medium is coupled to an electromechanical device imparting on said amplifying medium a periodic translational movement along an axis substantially parallel to the direction of propagation of said optical modes.

Advantageously, the amplitude of the movement obeys a sinusoidal law as a function of time, the product formed by the maximum amplitude of the periodic translational movement multiplied by the mean wave vector of the optical modes corresponds to half of one of the zeros of the Bessel function $J_0$ and the frequency of the periodic translational movement is of the same order of magnitude as or greater than the inverse of the lifetime of the population inversion in the amplifying medium.

Advantageously, the frequency of the movement is chosen so as to avoid parametric resonant frequencies, which would destabilize the laser. In particular, the said frequency may advantageously be well away from the relaxation frequency or frequencies of the laser.

Advantageously, the electromechanical device is of the piezoelectric type.

Advantageously, the laser gyro includes a device for stabilizing the intensity of the counterpropagating modes, which device may comprise an optical system placed in the cavity, said system comprising at least one polarizing element, an optical rotator exhibiting a non-reciprocal effect and an optical element, said optical element being either an optical rotator exhibiting a reciprocal effect or a birefringent element, at least one of the angles of rotation or the birefringence being adjustable.

The invention also relates to a system for measuring relative angular positions or angular velocities along three different axes, characterized in that it comprises three laser gyros having at least one of the preceding characteristics, these gyros being oriented along different directions and mounted on a common mechanical structure.

BRIEF DESCRIPTION OF THE DRAWINGS

The invention will be better understood and other advantages will become apparent on reading the following description given by way of non-limiting example and in conjunction with the appended figures in which.

MORE DETAILED DESCRIPTION

Figure 1:
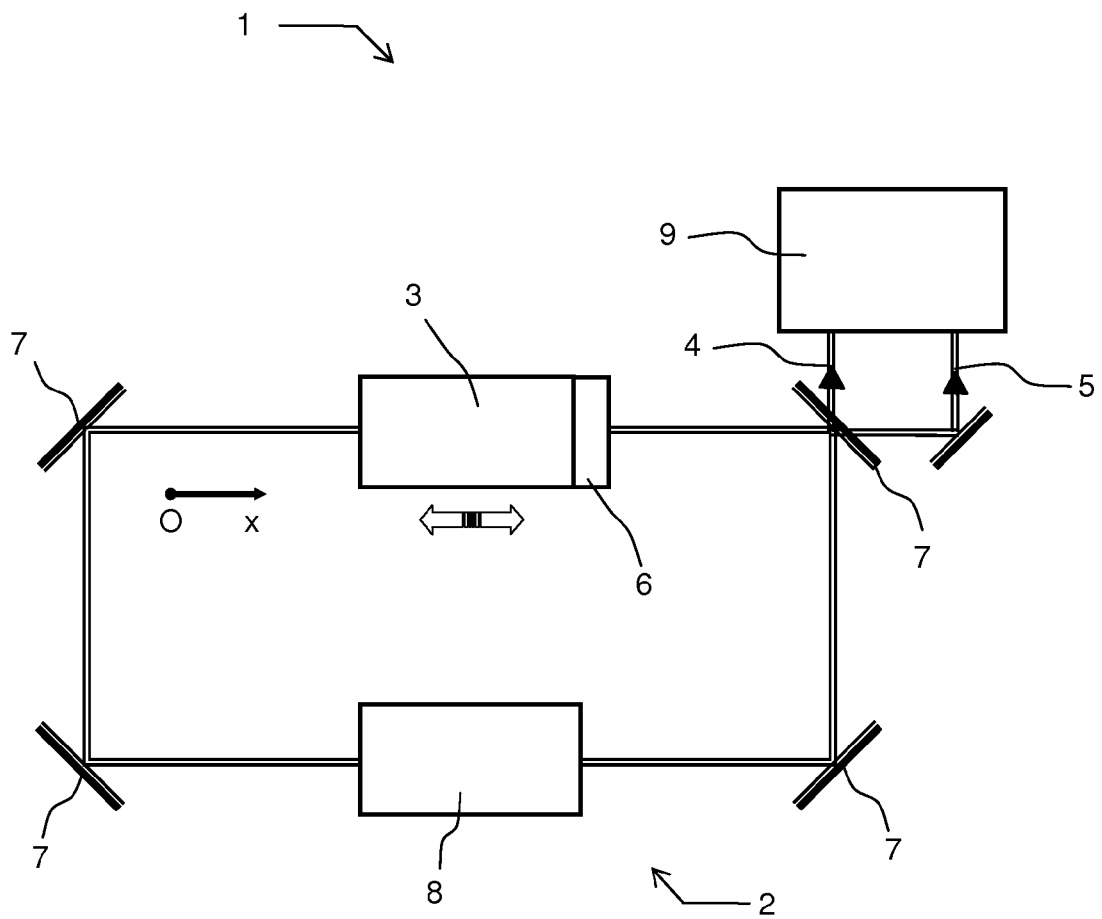
FIG. 1 shows a general view of a laser gyro according to the invention.

FIG. 1 shows a general view of a laser gyro 1 according to the invention. It comprises, conventionally:
- a ring cavity 2 composed of mirrors 7, in which two optical modes 4 and 5, called counterpropagating modes, circulate in opposite directions one with respect to the other;
- a solid-state amplifying medium 3 through which said modes pass;
- measurement means 9 comprising at least optical means for making the two optical modes interfere and calculation means for determining the angular displacement or the angular velocity of the cavity on the basis of the measurement of the interference patterns obtained; and
- optionally, other optical systems such as, for example, devices 8 for stabilizing the intensity of the counterpropagating modes.

In addition, the amplifying medium is coupled to an electromechanical device 6 imparting on said amplifying medium a time-dependent periodic translational movement denoted by $x_c(t)$ along an axis Ox substantially parallel to the direction of propagation of said optical modes and corresponding to the longitudinal axis of the cavity.

Under these conditions, the dynamics of the solid-state ring laser with a vibrating amplifying medium may be described by using the following equations, derived from the semiclassical Maxwell-Bloch theory, namely:

$$\begin{cases} \dfrac{d\tilde{E}_\pm(t)}{dt} = -\dfrac{\gamma_c}{2}\overline{E}_\pm(t) \pm i\dfrac{\Omega}{2}\overline{E}_\pm(t) + l\dfrac{\breve{m}_+ e^{\pm 2ik_c x_x(t)}}{2}\overline{E}_\pm(t) + \\ \qquad \dfrac{\sigma l}{2T}(1-i\delta)(N_0\overline{E}_+ + N_+ e^{\pm 2ik_c x_c(t)}\overline{E}_+) \\ \dfrac{\partial N}{\partial t} = W - \dfrac{N}{T_1} - \dfrac{aN}{2T_1}\left|\tilde{E}_+ e^{-ik_c(x+x_c)} + \tilde{E}_+ e^{ik_c(x+x_c)}\right|^2 \end{cases}$$

where $E_+$ and $E_-$ are the complex amplitudes of the counterpropagating modes;

γc are the cavity losses;

Ω is the non-reciprocity induced by the Sagnac effect;

$m_+$ and $m_-$ are the amplitudes of the backscattering induced by the moving amplifying medium in the two propagation directions denoted + and −. The backscattering induced by the fixed mirrors is not taken into account in these equations, for the sake of simplification;

$k_c$ is the wavevector of the laser;

σ is the laser emission cross section;

l is the length of the crystal;

T is the cavity transit time;

$N_0$ is the mean population inversion density N;

$N_+$ is the $2k_c$-order Fourier transform of N;

$N_-$ is the conjugate complex of $N_+$;

W is the optical pumping power;

$T_1$ is the lifetime of the excited level; and a is the saturation parameter.

Although the device can operate with various types of periodic translational movement, the simplest to implement is a movement of sinusoidal amplitude as a function of time t, which may be expressed in the form:

$$x_c(t)=x_M\sin(\omega_M t),$$

where $x_M$ is the maximum amplitude of the movement; and $\omega_M$ is the angular frequency of the movement given by the equation: $\omega_M=2\pi f_M$, where $f_M$ is the frequency of the movement.

It is apparent in the first line of the above system of equations that each mode may be backscattered in the opposite mode via two phenomena. The first phenomenon is induced by the conventional scattering of the light on the amplifying medium. It corresponds to the terms in $m_+$ and $m_-$. The second phenomenon is due to the presence of the population inversion grating. It corresponds to the terms in $N_+$ and $N_-$. In both cases, an additional phase factor due to the movement of the gain medium appears. It corresponds to the terms in $\exp(2ik_c x_c)$. If the amplitude and the frequency of this movement are sufficient, the effect obtained is a very substantial attenuation in the efficiency of these two types of coupling, which is manifested by an increase in the gyrometric performance of the laser, especially in terms of linearity of the frequency response.

Moreover, the movement of the gain medium also acts on the efficiency with which the electromagnetic waves write the population inversion grating. This is because, in the absence of movement, each atom sees a very different light intensity depending on whether it is on a node or an antinode of the standing wave. When the gain medium is undergoing a movement with sufficient amplitude and sufficient frequency, the intensity to which each atom is sensitive is neither a node nor an antinode, but the time average of a succession of nodes and antinodes. This has the effect of reducing the inhomogeneity of the light wave perceived by the atoms, and therefore the amplitude of the population inversion grating. In the case of a sinusoidal movement of amplitude $x_M$ and of sufficiently high frequency, it is possible to show that the average intensity seen by each atom becomes independent of the position when the following condition is met:

$$J_0(2k_c x_M)=0 \qquad \text{Equation 2}$$

where $J_0$ denotes the zero-order Bessel function J.

The device according to the invention therefore operates better when the Equation 2 is satisfied, that is to say when $2k_c x_M$ is a zero of the function $J_0$. By way of indication, an approximate value of the first terms of the series of the zeros of the function $J_0$ are given below:

2.405; 5.520; 8.654; 11.79; 14.93; 18.07; 21.21; 24.35; etc.

Of course, when condition (2) is not met, this will have less of an impact on the proper operation of the invention the larger the value of $k_c x_M$. In practice, this value will be determined by the technological limits on implementing the invention, for example the operating range of the piezoelectric shims used.

A third effect induced by the movement of the gain medium at the speed $V_c$ is the modification of the frequency non-reciprocity in the laser cavity by a factor proportional to $V_c$ according to the formula:

$$\Delta F = \frac{\Omega}{2\pi} - 2\frac{V_c L_{cristal}}{\lambda L_{cavité}}\left(n^2 - 1 + n\omega\frac{dn}{d\omega}\right)$$

where n denotes the optical index of the gain medium. In the case of a sinusoidal movement, as described by Equation 1, the induced non-reciprocity is similar to that normally used in mechanically activated laser gyros. In the latter case, a sinusoidal movement is no longer limited to the amplifying medium but imposed on the entire gain cavity.

By way of non-limiting example, for an oscillating movement of the gain medium given by $x(t)=x_m\sin(2\pi f_m t)$ with an amplitude $x_m$ of 8 microns, at a frequency $f_m$ of 5 kHz, the velocity of the gain medium, which is given by $V_c(t)=\dot{x}(t)=2\pi f_m x_m \cos(2\pi f_m t)$, reaches an amplitude of 0.25° m/s, which corresponds, for a gyro with a scale factor $K_1$ equal to 691°/s and an optical perimeter of 24 centimetres, in which the crystal has an index n of 1.82 and a length of 25 millimetres, to an amplitude bias of about 160°/s. Thus, the effect mentioned in this paragraph is indeed of the same order of magnitude as that usually introduced by mechanical activation, thereby making the proposed substitution realistic. In addition, this method retains an advantage intrinsic to mechanical movements, namely the time average value of the bias introduced after a long acquisition time does not drift. Of course, this is true only on condition that the parameters involved in generating the bias, such as the length of the crystal or the optical index, do not vary significantly over the course of a cycle of the movement of the gain medium. If necessary, a superactivation movement, like that normally used for mechanically activated laser gyros, may be imposed on the gain medium.

To summarize, by subjecting the gain medium in a solid-state laser gyro to a movement it is possible:
  to introduce an oscillating phase, which has the effect of averaging to zero the backscattering induced by the gain medium and by the population inversion grating;
  to displace the standing wave relative to the atoms of the gain medium, this having the effect of reducing the contrast of the population inversion grating; and
  to introduce a frequency-oscillating bias capable of substituting for or supplementing the effect of a mechanical activation.

The problem of intermodal competition is not entirely solved by the movement of the homogeneous gain medium. This is because the two counterpropagating modes always share the same atoms, and one of the two modes is liable to monopolize the available gain to the detriment of the other, which may disturb the gyro operation. The laser gyro according to the invention may therefore include, if necessary, a stabilizing device, which may comprise a feedback loop acting on the differential losses between modes.

The efficiency of the electromechanical device imparting on the amplifying medium a periodic translational movement depends on the choice of the frequency and the amplitude of the modulation. In particular, the device operates better the higher the vibration frequency. The typical time constant is the lifetime of the excited state in the gain medium. The vibration amplitude is typically of the same order of magnitude as the optical wavelength. As mentioned, there exists a series of discrete values of the vibration amplitude which maximize the efficiency of the invention.

To reduce effects of the light backscattering, the faces of the crystal must not be perpendicular to the propagation direction of the beam in the laser cavity. Advantageously, one of the faces of the crystal may be placed at the Brewster angle.

Figure 2:
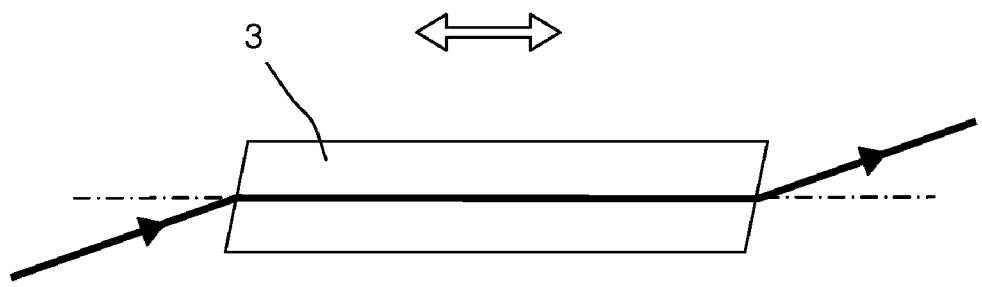
FIGS. 2, 3 and 4 show three different geometrical arrangements of the optical beams relative to the amplifying medium and relative to the direction of translational movement.
Figure 3:
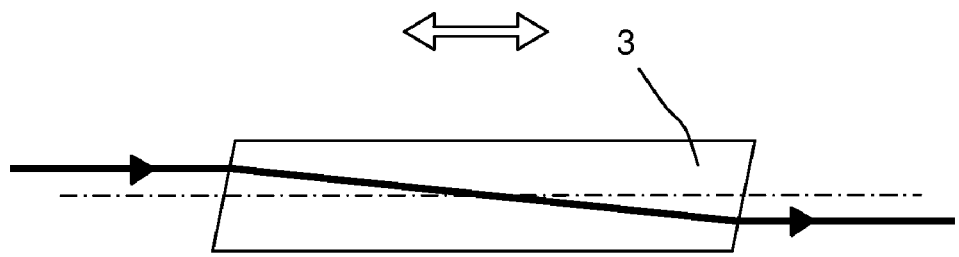
Figure 4:
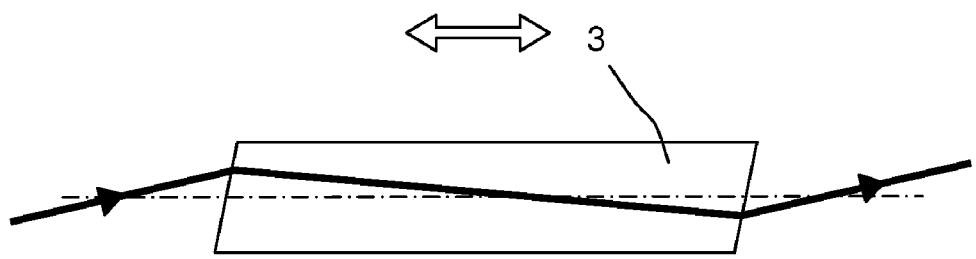

There are three possibilities as regards the direction of movement of the crystal, as indicated in FIGS. 2, 3 and 4:
  FIG. 2: the geometrical axis of the rod 3 is parallel to the direction of movement and to the axis of propagation of the beam in the crystal;
  FIG. 3: the axis of the incident beam is parallel to the direction of activation; and
  FIG. 4: the axis of the incident beam, the direction of propagation and the direction of movement are different.

Preferably, the optical axis of the amplifying crystal 3 will be chosen to be parallel to the direction of propagation of the beam in the crystal, as illustrated in FIG. 2.

As mentioned, it may be useful to place, inside the cavity 2, a device 8 for stabilizing the intensity of the counterpropagating modes. In general, the stabilizing device comprises an optical system placed in the cavity comprising at least one polarizing element, an optical rotator exhibiting a non-reciprocal effect and an optical element. This optical element is either an optical rotator exhibiting a reciprocal effect or a birefringent element. At least one of the effects or the birefringence is adjustable, according to the intensity difference existing between the two counterpropagating modes.

Figure 5:
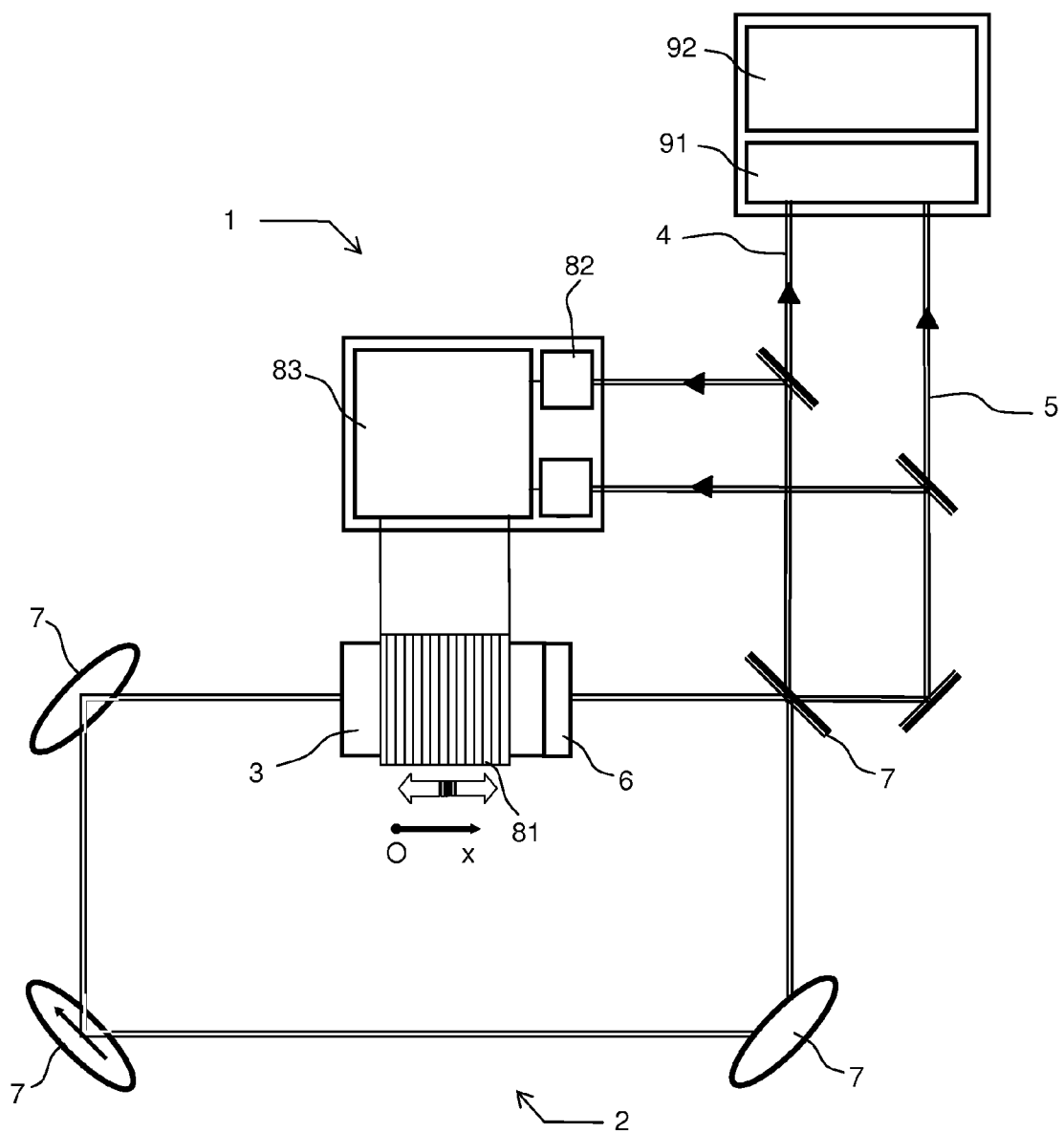
FIG. 5 shows an exemplary embodiment of a laser gyro according to the invention.

By way of non-limiting example, FIG. 5 shows a laser gyro that includes an electromechanical device according to the invention and a device for stabilizing the intensity of the counterpropagating modes.

The laser gyro 1 therefore comprises:
  a ring laser cavity 2 comprising four mirrors 7;
    the laser cavity has a slightly non-planar construction so as to induce a reciprocal rotation of the polarization by a few degrees. Thus, in FIG. 5, three of the four mirrors 7 are represented by inclined ellipses and
    one of the mirrors of the cavity has, in addition, a strong polarizing effect. This is because it is necessary, for proper operation of the mode intensity stabilizing device, for the modes to be polarized. The polarizing effect is shown symbolically by an arrow on one of the mirrors 7 in FIG. 5;
  an amplifying medium 3, which is a neodymium-doped YAG crystal optically pumped by a laser diode at 808 nm, said diode not being shown in FIG. 5;
  the YAG crystal 3 is mounted on a piezoelectric device 6 which vibrates it at a frequency of about 20 kilohertz with a maximum amplitude of about 8 microns;
  a stabilizing device comprising:
    two photodiodes 82 coupled to the servocontrol device 83 and measuring the intensity of the two counterpropagating optical modes 4 and 5,
    an electromagnetic coil 81 surrounding the YAG crystal, making it possible to introduce an adjustable Faraday effect and
    a servocontrol device 83 that generates a current flowing in the coil 81, said current being proportional to the difference in intensity between the counterpropagating modes 4 and 5. The sign of this current is chosen so that the more intense mode suffers the higher losses; and
  a device for reading and processing the gyrometric signal 9, comprising:
    optoelectronic means 91 for making the counterpropagating modes interfere and for measuring the parameters of the system of interfering fringes and
    calculation means 92 for recovering, from these parameters, the angular velocity or displacement information.

If necessary, the entire device is placed on a mechanical activation wheel.

Of course, it is possible to produce a system for measuring relative angular positions or angular velocities along three different axes comprising three laser gyros according to the invention, these being oriented along different directions and mounted on a common mechanical structure.

What is claimed is:

1. A laser gyro comprising:
   at least one optical cavity in the form of a ring and a solid-state amplifying medium which are designed so that two counterpropagating optical modes can propagate in opposite directions one with respect to the other inside said optical cavity and pass through the amplifying medium, the amplifying medium is coupled to an electromechanical device imparting on said amplifying medium a periodic translational movement along an axis substantially parallel to the direction of propagation of said optical modes.

2. The laser gyro according to claim 1, wherein the amplitude of the movement obeys a sinusoidal law as a function of time.

3. The laser gyro according to claim 1, wherein the product formed by the maximum amplitude of the periodic translational movement multiplied by the mean wave vector of the optical modes corresponds to half of one of the zeros of the zero-order Bessel function.

4. The laser gyro according to claim 1, wherein the frequency of the periodic translational movement is of the same order of magnitude as or greater than the inverse of the lifetime of the population inversion in the amplifying medium.

5. The laser gyro according to claim 1, wherein the frequency of the periodic translational movement is different from the parametric resonant frequencies, said resonant frequencies comprising the relaxation frequencies of the laser.

6. The laser gyro according to claim 1, wherein the electromechanical device is of the piezoelectric type.

7. The laser gyro according to claim 1, including a device for stabilizing the intensity of the counterpropagating modes.

8. The laser gyro according to claim 7, wherein the stabilizing device comprises an optical system placed in the cavity, said system comprising at least one polarizing element, an optical rotator exhibiting a non-reciprocal effect and an optical element, said optical element being either an optical rotator exhibiting a reciprocal effect or a birefringent element, at least one of the angles of rotation or the birefringence being adjustable.

9. A system for measuring relative angular positions or angular velocities along three different axes, comprising three laser gyros according to claim 1, these being oriented along different directions and mounted on a common mechanical structure.

10. The system according to claim 9, wherein the amplitude of the movement obeys a sinusoidal law as a function of time.

11. The system according to claim 9, wherein the product formed by the maximum amplitude of the periodic translational movement multiplied by the mean wave vector of the optical modes corresponds to half of one of the zeros of the zero-order Bessel function.

12. The system according to claim 9, wherein the product formed by the maximum amplitude of the periodic translational movement multiplied by the mean wave vector of the optical modes corresponds to half of one of the zeros of the zero-order Bessel function.

13. The system according to claim 9, wherein the frequency of the periodic translational movement is different from the parametric resonant frequencies, said resonant frequencies comprising the relaxation frequencies of the laser.

14. The system according to claim 9, wherein the electromechanical device is of the piezoelectric type.

15. The system according to claim 9, including a device for stabilizing the intensity of the counterpropagating modes.

16. The system according to claim 15, wherein the stabilizing device comprises an optical system placed in the cavity, said system comprising at least one polarizing element, an optical rotator exhibiting a non-reciprocal effect and an optical element, said optical element being either an optical rotator exhibiting a reciprocal effect or a birefringent element, at least one of the angles of rotation or the birefringence being adjustable.

* * * * *